Dec. 3, 1968 O. MARSCHALL 3,414,675
TELEPHONE HANDSET WITH PRESSURE GRADIENT MICROPHONE
SUBSTITUTED FOR CARBON MICROPHONE
Filed July 30, 1965
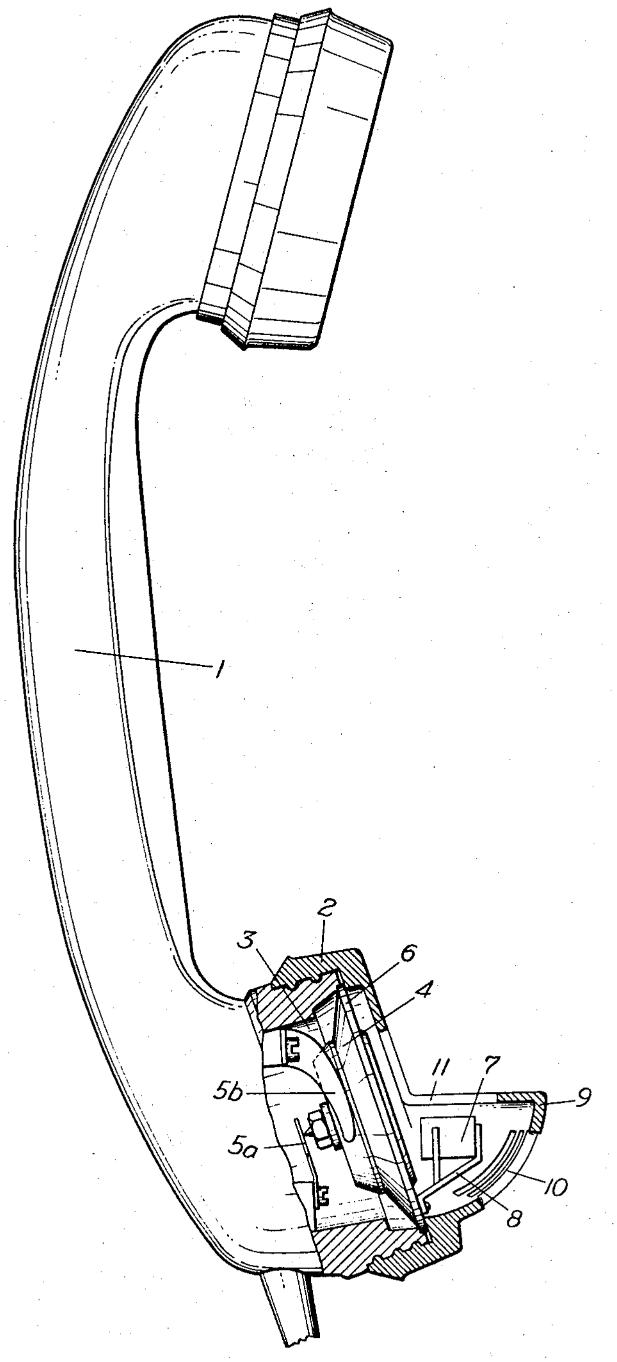

United States Patent Office 3,414,675
Patented Dec. 3, 1968

3,414,675

TELEPHONE HANDSET WITH PRESSURE GRADIENT MICROPHONE SUBSTITUTED FOR CARBON MICROPHONE

Otto Marschall, Schafberg, Austria, assignor to Akustische u. Kino-Geräte Gesellschaft m.b.H., Vienna, Austria Filed July 30, 1965, Ser. No. 476,083
Claims priority, application Austria, Aug. 11, 1964, A 6,896/64
5 Claims. (Cl. 179—1)

ABSTRACT OF THE DISCLOSURE

A replaceable unit for the carbon microphone button of a telephone handset includes an imperforate plate replacing the buton and completely closing off the button cavity, a transistor amplifier within the cavity, and a ventilated housing member replacing the cap. Mounted on the plate within the housing member is a pressure-gradient microphone oriented with its gradient axis directed toward the sound inlet opening and spaced from the plate for sound access to both its front and rear ends through openings of the housing member.

*Background of the invention*

This invention relates to a noise-compensating, moving-coil sound transducer, comprising a pressure gradient microphone button provided with a transistor amplifier. This arrangement can readily be substituted, as a unit, for the usual carbon microphone inserted in a telephone handset.

It is known that existing means do not enable sufficient intelligibility during a telephone conversation conducted from noisy areas. Various measures have already been suggested for an improvement of carbon microphones, but the results are not satisfactory, particularly because limits to the improvement are imposed by the inevitable distortion caused by carbon microphones.

For this reason, another known suggestion eliminates the carbon microphone and replaces the same by a pressure gradient microphone, which has a pronounced unilateral or bilateral directional response. This microphone is incorporated in the commercial telephone handset in such a manner that the sound has free access to the front and rear of the microphone. A transistor amplifier can also be accommodated in that portion of the telephone handset which serves for accommodating the carbon microphone.

According to this known suggestion, the button of the pressure gradient microphone is either inserted at the front end of the microphone cap or a new part is provided in the form of a ring, which is threaded onto the telephone handset instead of the microphone cap, and by which the pressure gradient microphone button can be pivotally moved into the optimum sound receiving position when this is required. While there are no objections to the last-described design from the acoustic aspect, the structural expenditure involved in it is excessive for a mass-produced item, such as a telephone station.

This objection is not applicable to the design described first hereinbefore, but the same has acoustic disadvantages because the microphone is mounted at the front end of the microphone cap, directly in the sound inlet opening, so that there is a cavity behind the microphone button. This cavity gives rise to detrimental resonance effects in spite of the openings provided in the wall of the microphone cap, and these resonance effects may adversely effect the intelligibility. More specifically, the cavity may be induced to resonate at its natural frequency by certain frequencies of the noise in the area. In this case the object of the arrangement, to provide a substantially noisefree transmission of speech from a noisy area, cannot be accomplished in practice.

The arrangement just discussed has the further disadvantage that the transistor amplifier constitutes a self-contained unit which can be substituted for the carbon microphone. This requires additional connections, which may tear or break, particularly in the embodiment in which the microphone can be swung out forwardly.

The invention avoids all these disadvantages in that a noise-compensating, moving coil sound transducer, consisting of a pressure gradient microphone button, is disposed within a ventilated housing, which replaces the microphone cap, and in front of a closed wall, which closes the cavity provided for the carbon microphone button. The transistor amplifier is disposed behind the wall, in a housing which is dimensioned like the usual carbon microphone button, the amplifier housing, the pressure gradient microphone button and the wall being assembled to form a readily replaceable unit, which takes the place of the carbon microphone-button.

In the housing, which takes the place of the microphone cap, the microphone button is suitably arranged in such a manner that the axis of the microphone button is directed directly toward the sound source. Thus, the axis need not be parallel to the wall which closes the microphone cavity, but may be at a small angle thereto.

According to a further feature of the invention, the wall which closes the microphone cavity may be used as a mounting plate for the transistor amplifier. This is particularly advantageous for a circuit having printed circuit connections.

For an understanding of the principles of the invention, reference is made to the following description of a typical embodiment thereof as illustrated in the accompanying drawing. In the drawing, the single figure is a part elevation and part sectional view of a telephone handset, with the section being taken through the lower portion of the handset and which usually contains the microphone.

In accordance with the present invention, the carbon microphone is replaced by the unit of the invention. The telephone handset is designated 1. The transistor amplifier has a housing 4, which corresponds to the dimensions of the carbon microphone and is accommodated in the cavity 3, which is intended for accommodating the carbon microphone. Terminals 5*a*, 5*b* are provided on this housing as on a normal microphone button. The transistor housing 4 is firmly mounted on the plate or wall 6, which closes the cavity for the carbon microphone button. The threaded ring 2 of the telephone handset 1 holds the plate 6 in the correct position. Recesses and projections may be provided, if desired, which enable the insertion of the plate-like wall 6 in only a single position.

The pressure gradient microphone button 7 contains an electro-dynamic transducer of the moving coil type, and may be made with very small dimensions. For this reason it can be accommodated without difficulty within a housing 9 which is similar in shape to the usual microphone cap. This housing 9 may be an independent part, as is the case with the units which are presently commerically available, and in this case the housing is also held in position by the threaded ring 2. Alternatively, the housing may form a unit together with the insert according to the invention. In the drawing, the latter case is shown for the sake of clearness. It may be more appropriate, however, to use the conventional microphone caps when the same have been provided with additional bores for the access of sound to the rear of the microphone. Owing to the small dimensions of the pressure gradient button (16–20 mm. in diameter), the housing 9 may be so small that it does not interfere with the placing of the telephone handset onto the cradle of the table telephone set.

The openings which enable an access of sound to the interior of the housing 9 are indicated at 10 and 11. Only two of these openings are shown in the drawings, although more openings may be provided because the opening 11 represents only the speech inlet openings, which are suitably formed with slots, whereas the opening 10 represents all openings which enable an access of sound from the rear.

The pressure gradient microphone button 7 is accommodated and mounted in any suitable manner within the housing 9, e.g., by means of an angle bracket 8, which is secured to the wall 6. A resilient mounting for the microphone button 7 may be provided in order to protect the latter from shock.

A further improvement in the transmitting properties is afforded by the invention unit by the provision of a wind guard so that the strong breathing noise of a person who is talking loudly in a noisy area, or strong air movements, are rendered ineffective. The wind guard may be provided by wind guard material covering the front and rear of the microphone button 7, or the ventilated forward extension 9 may be provided with wind guard material.

As has been mentioned hereinbefore, the arrangement according to the invention may readily take the place of the usual carbon microphone button. As there is no need for a change of circuit connections, the replacement may be carried out even by unskilled persons.

While specific embodiments of the invention have been shown and described in detail to illustrate the application of the principles of the invention, it will be understood that the invention may be embodied otherwise without departing from such principles.

What is claimed is:

1. For use in a telephone handset formed with a cavity receiving a carbon microphone button closing the cavity and having a cap retaining the button in position: a replaceable unit for the carbon microphone button comprising, in combination, an imperforate wall member replacing said button and completely closing and sealing said cavity; a housing on the inner surface of said wall member within said cavity, and having dimensions of the order of those of said microphone button; a transistor amplifier within said housing; a ventilated housing member replacing said cap and retaining said wall member in position, and having a sound inlet opening in addition to its other openings; and a sound transducer assembly, including a noise-compensating, pressure-gradient microphone button mounted on said wall member within said ventilated housing member and electrically connected to said transistor amplifier; said pressure-gradient microphone button having its gradient axis directed toward said sound inlet opening, and being spaced from said wall member for sound access, through the openings of said ventilated housing member, to both its front and rear ends.

2. For use in a telephone handset, a replaceable unit, as claimed in claim 1, in which the gradient axis of said pressure-gradient microphone button extends parallel to said wall member.

3. For use in a telephone handset, a replaceable unit, as claimed in claim 1, in which the axis of said pressure-gradient microphone button extends at an acute angle of from 15° to 30° to said wall member.

4. For use in a telephone handset, a replaceable unit, as claimed in claim 1, in which said wall member comprises a printed circuit board mounting said transistor amplifier and having the circuit connections therefor.

5. For use in a telephone handset, a replaceable unit, as claimed in claim 1, including means resiliently mounting said pressure-gradient microphone button on said wall member.

References Cited

UNITED STATES PATENTS

| | | | |
|---|---|---|---|
| 2,870,255 | 1/1959 | Jenkins et al. | |
| 2,773,933 | 12/1956 | Hawley. | |
| 2,200,794 | 5/1940 | Krantz | 179—103 |

KATHLEEN H. CLAFFY, *Primary Examiner.*

R. P. TAYLOR, *Assistant Examiner.*